United States Patent
Ivanov et al.

(10) Patent No.: US 12,423,133 B2
(45) Date of Patent: Sep. 23, 2025

(54) SCHEDULING ACTIONS IN MULTIPLE REPLICAS OF COMPUTING ENVIRONMENT USING CONSENSUS PROTOCOL

(71) Applicant: VMware LLC, Palo Alto, CA (US)

(72) Inventors: Petar Nedkov Ivanov, Sofia (BG); Ittai David Abraham, Tel Aviv (IL)

(73) Assignee: VMware LLC, Palo Alto, CA (US)

( * ) Notice: Subject to any disclaimer, the term of this patent is extended or adjusted under 35 U.S.C. 154(b) by 605 days.

(21) Appl. No.: 17/578,715

(22) Filed: Jan. 19, 2022

(65) Prior Publication Data
US 2023/0229488 A1   Jul. 20, 2023

(51) Int. Cl.
*G06F 9/48* (2006.01)
*G06F 9/54* (2006.01)
*G06F 16/27* (2019.01)

(52) U.S. Cl.
CPC .............. *G06F 9/48* (2013.01); *G06F 9/542* (2013.01); *G06F 16/27* (2019.01)

(58) Field of Classification Search
CPC . G06F 9/48; G06F 9/542; G06F 16/27; G06F 16/275; G06F 1/329; G06F 9/4843; G06F 9/4881; G06F 9/4887
See application file for complete search history.

(56) References Cited

U.S. PATENT DOCUMENTS

| | | | | |
|---|---|---|---|---|
| 8,135,987 | B2* | 3/2012 | Douceur | G06F 11/187 714/4.11 |
| 10,848,549 | B1* | 11/2020 | Rizvi | H04L 67/01 |
| 10,909,131 | B1* | 2/2021 | Graham | G06F 16/901 |
| 11,334,561 | B2* | 5/2022 | Malkhi | G06Q 20/065 |
| 11,960,452 | B2* | 4/2024 | Memon | G06F 16/116 |
| 2016/0292663 | A1* | 10/2016 | Sagan | G06Q 20/10 |
| 2017/0139977 | A1* | 5/2017 | Batra | G06F 16/27 |
| 2020/0218823 | A1* | 7/2020 | Mizrakhi | G06F 21/602 |
| 2023/0069165 | A1* | 3/2023 | Parvanov | H04L 67/1095 |
| 2023/0141966 | A1* | 5/2023 | Weeden | H04L 63/0823 713/185 |
| 2023/0163973 | A1* | 5/2023 | Rambaud | H04L 9/3239 713/176 |

* cited by examiner

*Primary Examiner* — Andy Ho
(74) *Attorney, Agent, or Firm* — Quarles & Brady LLP

(57) ABSTRACT

Embodiments of the present invention provide systems, methods, and software to manage actions across a cluster of replica computing nodes for a data structure. In one implementation, a first replica in the cluster generates a first action notification and receives one or more additional action notifications from at least one other replica in the cluster. The first replica further determines that consensus exists for the first action notification based on the one or more additional action notifications and, in response to determining that consensus exists, identifies one or more rules associated with the first action notification and initiates one or more actions corresponding to the one or more rules.

19 Claims, 5 Drawing Sheets

US 12,423,133 B2

SCHEDULING ACTIONS IN MULTIPLE REPLICAS OF COMPUTING ENVIRONMENT USING CONSENSUS PROTOCOL

TECHNICAL BACKGROUND

Computing environments may use multiple different computing nodes to implement replicas of databases or other data structures. These computing nodes may comprise virtual machines, physical computing systems, or some other computing system. The databases may maintain financial information, transaction information, or some other information that can be replicated across multiple computing nodes.

As a database is deployed across the different replicas, changes or actions can be taken on the database, wherein the actions can be used to add data to the database, remove data from the database, prune the database (remove historical data from the database to reduce the database size), or provide some other action in relation to the database. However, difficulties can arise when a user desires to implement an action that repeats over multiple periods. The issue can be compounded as the number of repeatable actions is increased or becomes more complex.

SUMMARY

The technology described herein manages action scheduling for a database replicated across multiple replica computing nodes. In one implementation, a replica in a cluster of replicas generates a first action notification at the replica and receives one or more additional action notifications from one or more other replicas in the cluster of replicas. The replica further determines that a consensus exists for the first action notification based on the one or more additional action notifications. Once the replica determines that a consensus exists, the replica identifies one or more rules associated with the first action notification and initiates one or more actions associated with the one or more rules on a data structure supported by the replica.

DETAILED DESCRIPTION

Figure 1:
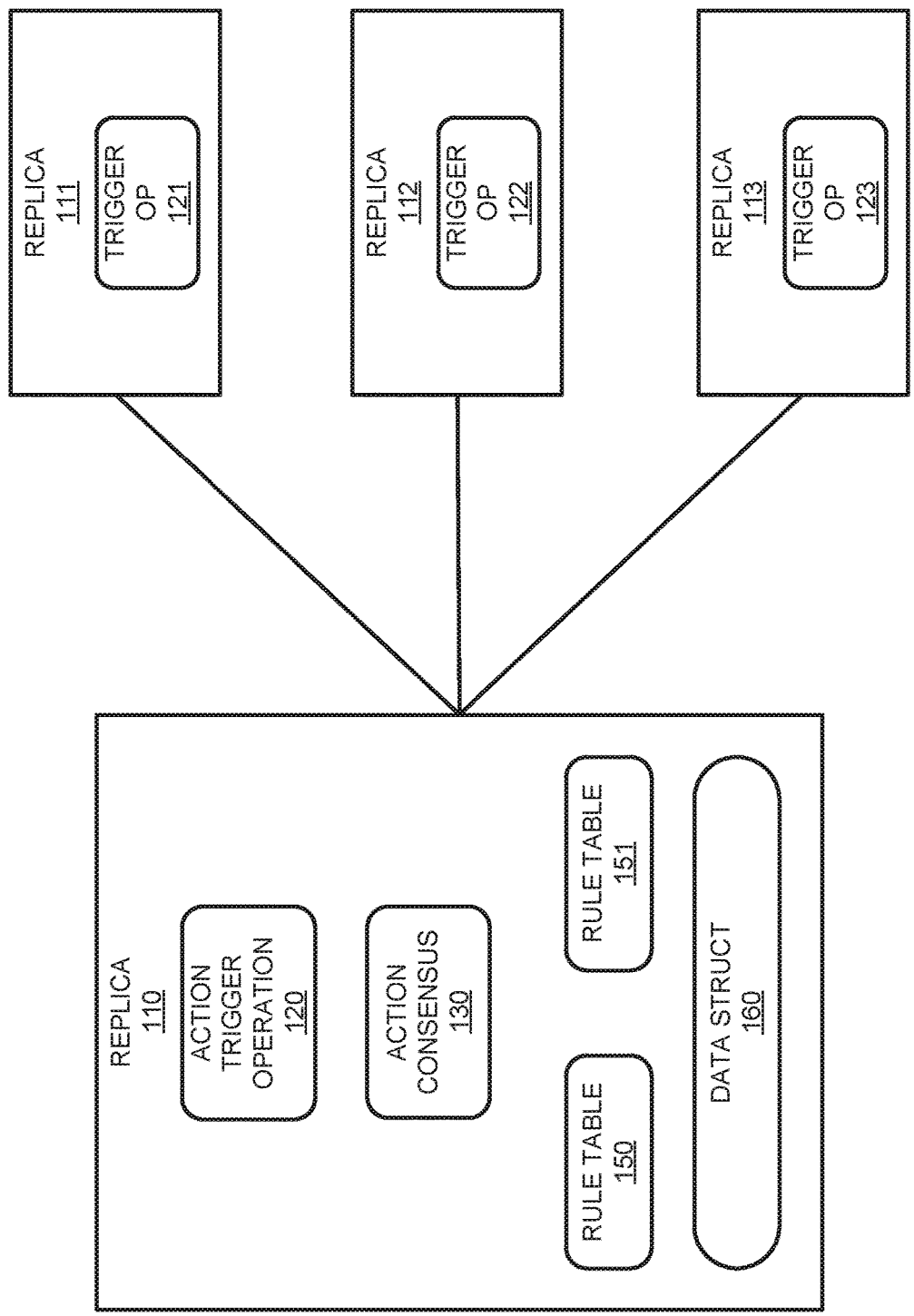
FIG. 1 illustrates a computing environment to schedule actions across multiple replicas according to an implementation.

FIG. 1 illustrates a computing environment 100 to schedule actions across multiple replicas according to an implementation. Computing environment 100 includes replicas 110-113 that can each be representative of a virtual machine, container, or some other virtualized endpoint, or may comprise physical computing systems in some examples. Replica 110 further includes action trigger operation 120, action consensus 130, rule tables 150-151, and data structure 160. Replicas 111-113 further includes action trigger operations 121-123 and further include a duplicated version of data structure 160 (not pictured).

In computing environment 100, replicas 110-113 are used to support a replicated data structure 160 that is maintained individually by each replica of replicas 110-113. Data structure 160 may be representative of a transaction database, a data structure representing entities of an organization (personnel, products, and the like), or some other data structure. Data structure 160 may represent a table, a data tree, a blockchain, or some other type of data structure. In maintaining data structure 160, changes that are implemented at a first replica in computing environment 100 must be replicated at other replicas in the computing environment. For example, if replica 110 initiated an action to prune data structure 160 or remove historical data from the database, the action must also be committed on replicas 111-113.

Here, a user or application associated with data structure 160 may desire to implement scheduled actions for the database, wherein the action can be a single action or may be an action that is carried out at defined intervals. These actions can be implemented as state machine replication (SMR), wherein the scheduled actions or state updates at a first replica must also be carried out at the other replicas. SMR is used to ensure that the same actions are taken at each of the replicas in the same sequence, permitting each of the replicas to implement the same operations on the data structure.

Returning to the pruning example, an application may generate a request to prune data structure 160 every hour. To implement the desired prune action, a rule may be supplied or distributed to each replica in replicas 110-113, wherein the rule may include timing information for implementing the prune action and the action itself. The timing information may indicate a start timestamp for the desired action, time periods between the actions, or some other timing information for scheduling the action at each of the replicas. In some implementations, when a new rule is generated, the replicas may exchange consensus information, such as signatures to verify the source and/or start time of the rule. For example, when a rule is generated at replica 110, the rule can be distributed to other replicas in computing environment 110, wherein the distribution may include a signature or proof that the rule was originated by replica 110. Replicas 111-113 may verify the source of the rule using the signature once a consensus is reached (e.g., more than fifty percent verify the rule), the rule can be implemented by each of the replicas. In some implementations, the consensus determination may be used to determine a start time or timestamp for starting the implementation of the rule. The timestamp may be provided as part of the rule or may be determined based on an exchange between the replicas to identify an available start time associated with implementing the rule.

In some examples, once consensus is identified for a rule, each of the replicas may use action trigger operations 120-123 to generate action notifications (or ticks) that can be distributed in accordance with the timing information provided by the rule. Specifically, the action trigger notifications may be generated and exchanged by the various replicas to trigger actions associated with one or more rules. Action trigger operations 120-123 may be used to initiate an action in accordance with the rule and the timing information provided by the rule. For example, the pruning rule may be used to generate a notification hourly and distribute a notification to the other replicas in computing environment 100. Specifically, action trigger operation 120 may generate a notification that is distributed to at least one other replica in computing environment 100 to start a consensus process for the action notification. The consensus operation may be used to determine whether a threshold number of the replicas generate the same action notification.

In some implementations, the action notification that is generated locally at each replica may be different format or include different information than the action notifications that are distributed between the replicas. For example, replica 110 may generate an action notification using action trigger operation 120. Replica 110 may then receive action notifications from replicas 111-113, wherein the received action notifications include signatures, timestamps, hashes, identifiers, or some other information that can be used in determining consensus for the locally generated action notification. The action notifications may be communicated in accordance Byzantine Fault Tolerant (BFT) consensus protocol or some other protocol, wherein a locally generated action notification may be confirmed using the information provided by one or more of the other replicas.

Once a consensus is determined for the notification, each of the replicas may identify one or more rules associated with the first action notification and initiate one or more actions from the one or more rules on a data structure supported by the replicas. As an example, if an action notification is generated by replica 110 that corresponds to the pruning rule, replica 110 may wait until a consensus is identified from other replicas 111-113. Once a consensus is identified, replica 110 may identify rules corresponding to the notification in rule tables 150-151. In some examples, rule tables 150-151 may represent Cron tables that are used to schedule commands in operating systems, such as Linux operating systems. Any rules that match or return true for the notification are identified, and actions corresponding to the identified rules are taken in data structure 160. For example, if the notification matched a rule for an action to prune data structure 160, the pruning action can be scheduled in accordance with the rule. The scheduling may permit the rule to be implemented in response to the consensus being received for the rule or may be implemented at a defined period following consensus (e.g., a rule that implements the action five seconds following the timestamp associated with the action notification). In some implementations, the actions that are implemented on the database may be implemented as SMR, wherein each of the replicas maintain a version of the data structure. To ensure that the state is maintained across each of the replicas, the replicas may exchange action notifications that are used to trigger one or more actions or are used to update the state associated with each of the replicas. Specifically, for each action notification, the replicas may determine if there is consensus for the action notification and may trigger one or more actions associated with the action notification. The one or more actions may be triggered in a sequence associated with the priority for each of the one or more actions, such that the actions are triggered in a common sequence amongst all the replicas.

In some examples, multiple Cron tables are deployed that can be triggered by identifiers in the action notifications. For example, action trigger operation 120 may generate notifications with a first identifier that corresponds to rules in rule table 150 and may further generate notifications with a second identifier that corresponds to rules in rule table 151. Based on the identifier, rules within the corresponding table can be identified, wherein each rule may include one or more actions.

In some implementations, an action notification generated at a replica of replicas 110-113 may not receive consensus from the other replicas in computing environment 100. For example, replica 110 may generate an action notification that is distributed to at least one other replica in computing environment 100. After distributing the notification, the other replicas may determine whether a consensus exists for the notification, and when a consensus does not exist, prevent the implementation of any action associated with the notification. Thus, even if replica 110 implemented an action associated with the notification without consensus from the other replicas, the other replicas 111-113 may stop the implementation of any actions on the locally maintained database.

Figure 2:
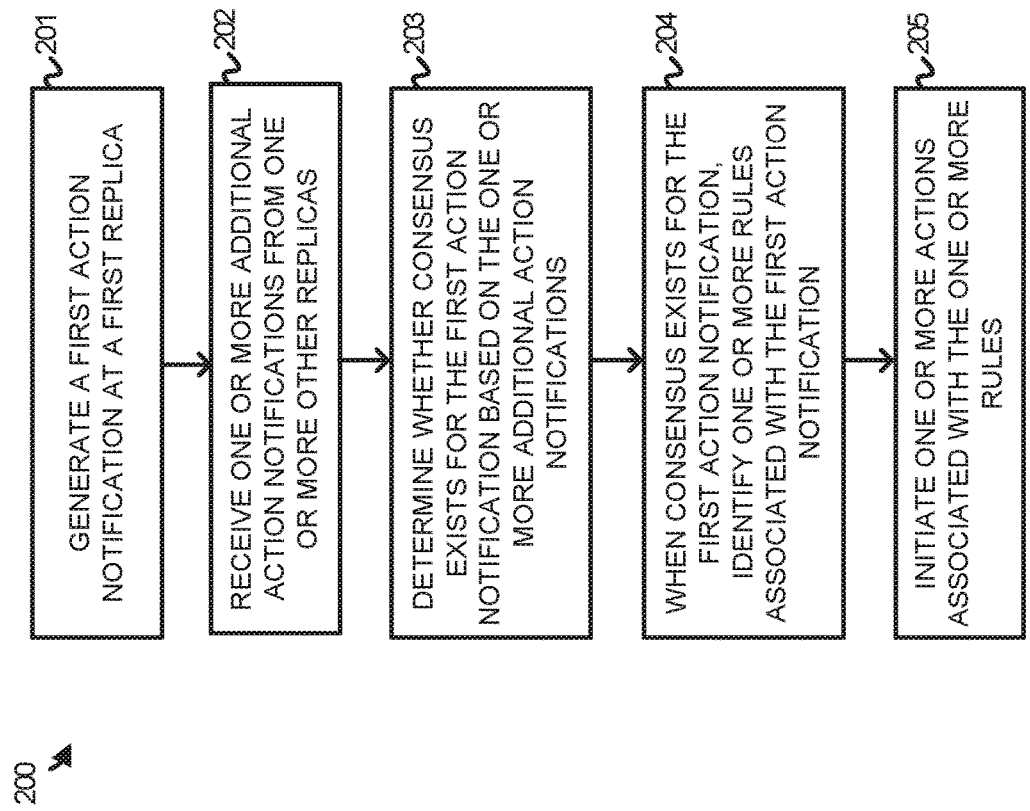
FIG. 2 illustrates an operation of a replica in a computing environment to manage action scheduling according to an implementation.

FIG. 2 illustrates an operation 200 of a replica in a computing environment to manage action scheduling according to an implementation. The steps of operation 200 are referenced parenthetically in the paragraphs that follow with reference to systems and elements of computing environment 100 of FIG. 1. The steps are demonstrated below with respect to replica 110, however, similar operations 110 may be implemented by replicas 111-113 to maintain a local version of data structure 160.

Replicas in computing environment 100 may be distributed with rules that are used to implement actions in relation to a locally maintained version of a data structure. Each of the rules may indicate at least an action to be implemented and timing information indicating times for when the action should be implemented. For example, a rule to implement repeat transactions in a data structure may be used to repeat the transaction once per day for ten days. After the rules are distributed, each of the replicas can implement the actions using an action trigger operation that generates notifications based on a clock maintained by each of the replicas. In some implementations, prior to implementing an action, the replicas may validate a rule based on a consensus for the rules. As an example, a rule generated by replica 110 may be distributed to other replicas 111-113, wherein the replicas may determine whether the rule may be valid when a consensus, or a minimum percentage of the replicas, indicate that the rule is valid. In determining if the rule is valid, a rule may be signed by the generating replica and distributed to at least one other replica in the computing environment. The replica may use the signature or the identifying information in the packet (e.g., provable solution identifying the creating replica) to determine whether the new rule is valid. If the rule is not valid, then the rule may not be added to the available rules at the replica. If the rule is valid, then the rule is added to the available rules. In some implementations, the consensus determination for a rule may be used to initiate or synchronize the trigger operations associated with the rule, whether the trigger operations (or operations initiating the action notifications) may be started at the same time to synchronize the generation of action notifications.

After adding the rules to the replicas in the computing environment, replica 110 may generate (201) a first action notification. For example, a rule may request that a prune action be taken every hour, wherein replica 110 may generate an action notification every hour to support the generated rule. In some examples, the action trigger operation 120 may be initiated to support a rule after consensus is received for the rule. For example, once replicas 110-113 have consensus for a newly generated rule, each of the replicas may initiate an action trigger operation to generate notifications for the rule.

In addition to generating the first action notification, replica 110 further receives (202) one or more additional action notifications from one or more other replicas in the cluster of replicas and determines (203) that consensus exists for the first action notification based on the one or more additional action notifications. In some implementations, the replicas within computing environment 100 may each generate notifications to support a rule. Returning to the example of the pruning operation every hour, each replica of replicas 110-113 may generate notifications for each hour and distribute the notifications to one or more other replicas in the computing environment. The replicas may then determine whether a consensus exists for the notification based on whether a consensus of the replicas generate the same notification. If a replica identifies that a consensus does not exist, then an action will not be performed in accordance with the notification.

In contrast, when replica 110 determines that consensus exists for the first action notification, replica 110 identifies (204) one or more rules associated with the first action notification, and initiates (205) one or more actions associated with the one or more rules on a data structure supported by the replica. As described previously, each replica of replicas 110-113 may be distributed rules that indicate actions to be implemented at one or more instances. The rules may indicate a single time for an action to be implemented or may indicate intervals of multiple times for the action to be implemented. To ensure that each action is implemented at the required times associated with the rules, each of the replicas can generate action notifications and exchange the action notifications to determine when consensus exists for the notifications. For example, replicas 111-113 may each generate an action notification in support of a rule distributed to all replicas 110-113, wherein the action notification may be generated at a time stamp associated with the rule. The action notifications may then be used with the action notification generated by replica 110 to determine whether a consensus exists in support of the notification. When a consensus exists, such as when a threshold number of replicas generate the same notification, one or more rules associated with the notification can be identified and actions associated with the one or more rules can be implemented. In at least one implementation, a replica may maintain multiple different rule sets or rule tables, such as rule tables 150-151. The action notification may indicate a timestamp associated with the notification and may further identify a rule table to which the action notification corresponds. For example, an action notification may correspond to rule table 150, wherein the rule table may be searched to identify any rules that correspond to the timestamp of the generated action notification. Rules that correspond to the action notification may be identified and actions initiated from the rule table.

In some implementations, the action notification that is generated locally at each replica may be different format or include different information than the action notifications that are distributed between the replicas. For example, replica 110 may generate an action notification using action trigger operation 120. Replica 110 may then receive action notifications from replicas 111-113, wherein the received action notifications include signatures, hashed values, timestamps, identifiers, or some other information that can be used in determining consensus for the locally generated action notification. In some implementations, in determining whether there is consensus for each locally generated action notification, the computing environment may use Byzantine Fault Tolerant (BFT) consensus protocol or some other consensus protocol. In some examples, when replica 110 generates an action notification based on a period specified by a rule, replica 110 may communicate a notification to at least one other replicas of replicas 111-113, wherein the notification may be used by the other replicas to locally determine whether consensus exists. Thus, while a local action notification is generated at replica 110, the actions notifications that are received or exchanged between the replicas are merely used to provide consensus via signatures, hashes, or other checks that a consensus exists for the locally generated notification.

In some implementations, the replicas of the system may provide a SMR system that is used to ensure state updates are systematically updated in the same manner across all replicas. To maintain the state across all replicas, each of the replicas may generate and exchange action notifications and determine when consensus exists for each of the action notifications. When consensus exists, actions associated with the notification (e.g., actions in rules that qualify for the notification) are identified and queued for application. In some examples, the actions are ordered based on their order in rule tables 150-151, wherein actions can be sequenced such that a first action is applied prior to a second action. For example, an action notification that goes through consensus from other replicas 111-113 may be determined to apply to rule table 150. Once rule table 150 is identified, rules and actions that qualify for the action notification are identified and queued for execution against data structure 160. The actions may be queued in accordance with their sequencing or configuration within rule table 150. Similarly, while the action is being applied at replica 110, each other replica that also identifies consensus from the action notifications may queue the same one or more actions as replica 110. Advantageously, each of the replicas may implement the same sequence of actions based on consensus for an action notification. Specifically, each action notification may include a timestamp and may correspond to one or more actions. When consensus exists, each replica of replicas 110-113 that identifies consensus can implement the identified actions in the same sequence, such that the data structure is replicated across each of the replicas.

Figure 3:
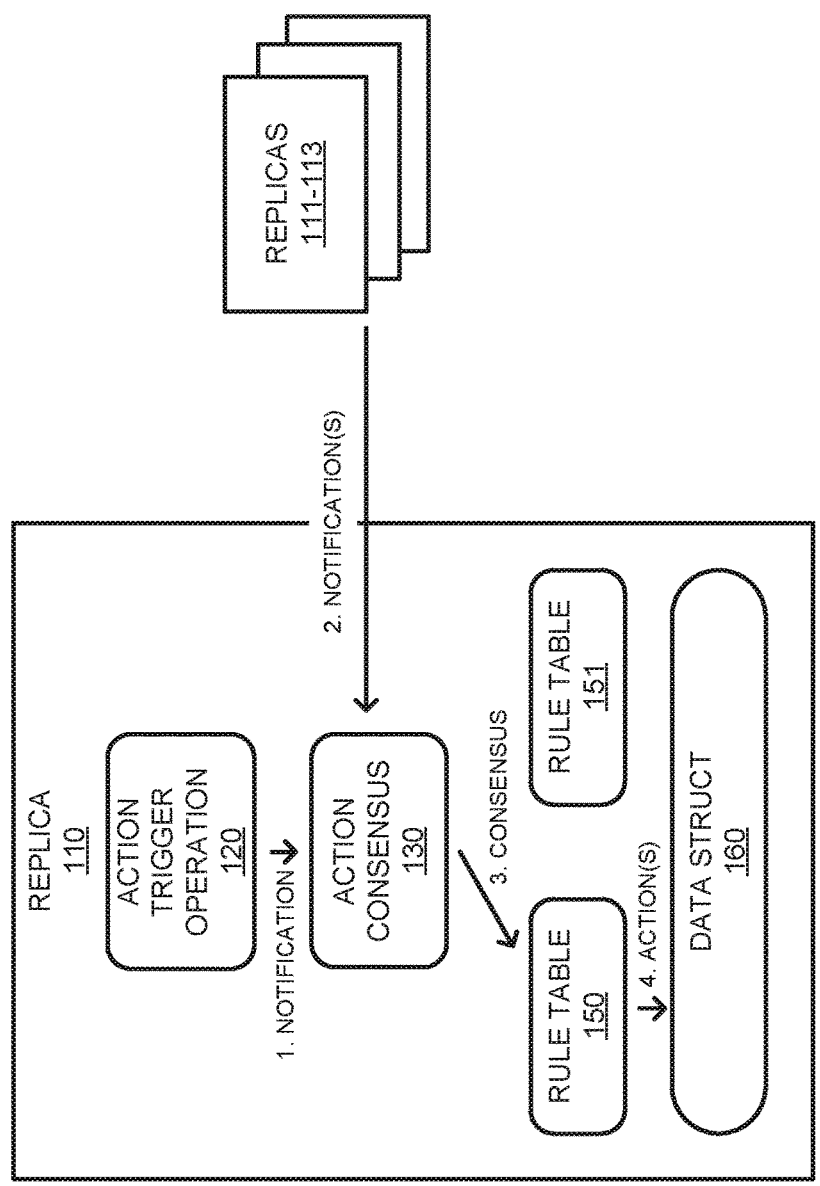
FIG. 3 illustrates an operational scenario of initiating an action in replicas of a computing environment according to an implementation.

FIG. 3 illustrates an operational scenario 300 of initiating an action in replicas of a computing environment according to an implementation. Timing diagram 300 includes elements of replica 110 of FIG. 1.

In operational scenario 300, action trigger operation 120 generates a first action notification at step 1 that is communicated to action consensus 130. Action consensus 130 receives one or more additional action notifications from one or more other replicas at step 2 and determines whether a consensus exists for the first action notification based on the one or more additional action notifications at step 3. In some implementations, the other replicas in the cluster may distribute action notifications as they are generated in accordance with the rules distributed to each of the replicas. For example, a rule may schedule an action to take place every hour on the replicated data structure at each of the replicas. After each hour, the replicas in the cluster will generate an action notification corresponding to the action and distribute the action to one or more other replicas in the cluster. Each of the replicas may then determine whether consensus exists based on the notifications from the other replicas and either block or select an action based on whether consensus exists. When consensus does not exist, or when there are fewer than a threshold number of replicas generating a notification that matches the notification generated at replica 110, any action may be blocked in association with the notification.

When a consensus is determined for the notification, one or more rules are identified in association with the notification at step 4 and actions are taken that correspond to the one or more rules. In some implementations the notification may indicate a rule table or a set of one or more rules for which the notification applies. Referring to the example for replica 110, the action notification may indicate a rule table from rule tables 150-151 for the action notification. The rule table can then be searched to identify one or more rules that correspond to the action notification and actions can be taken that correspond to the identified rules. Advantageously, a set of rules can share a notification, but will only be applied when the timestamp on the notification matches a requirement for the rule. For example, a first rule may require an action to be implemented every hour, while a second rule may require an action to be implemented every other hour. When an action notification is received, the identifier in the notification and the timestamp in the notification may be compared to the available rules to determine which rules and actions should be initiated.

Figure 4:
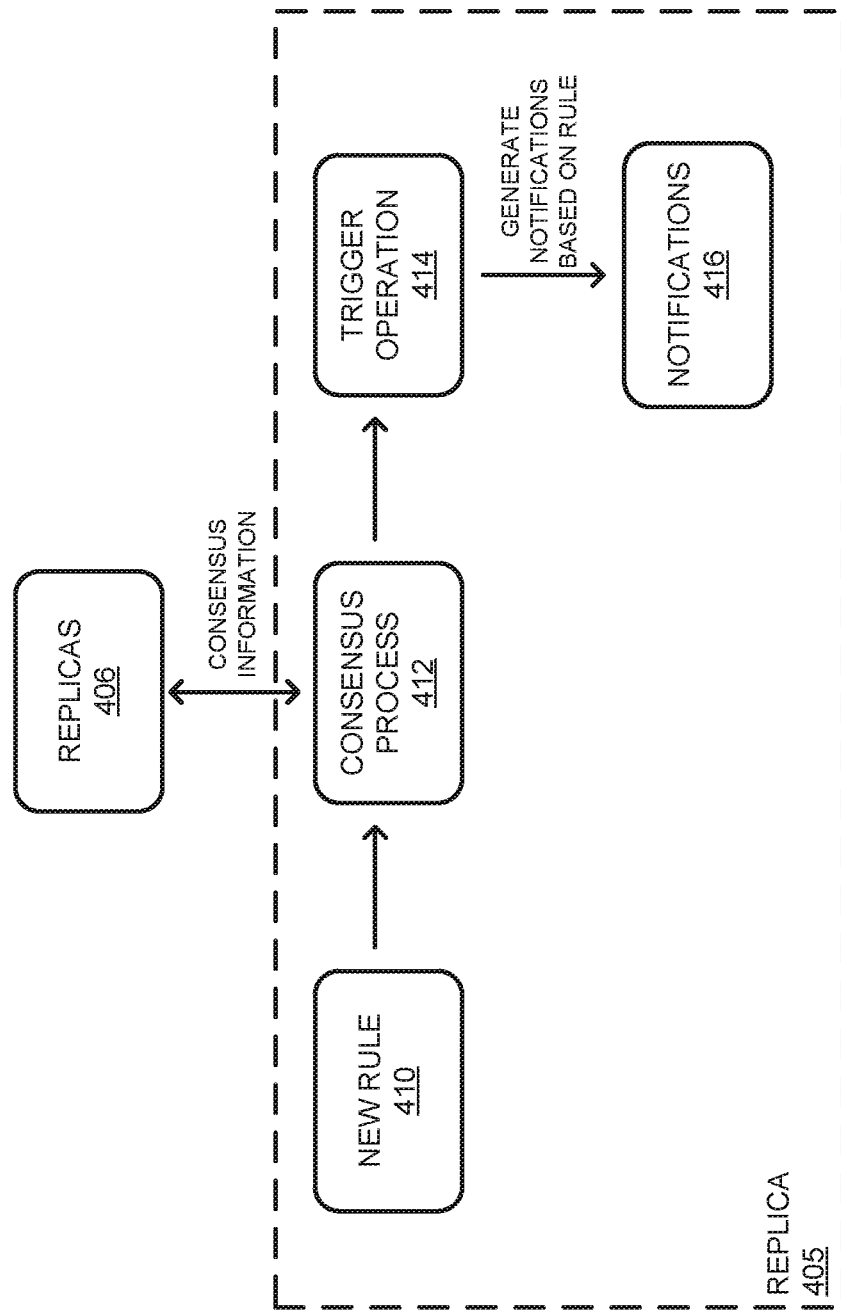
FIG. 4 illustrates an operational scenario of adding a rule to a computing environment according to an implementation.

FIG. 4 illustrates an operational scenario 400 of adding a rule to a computing environment according to an implementation. Operational scenario 400 includes replica 405 and replicas 420, wherein each of the replicas may maintain a version of a data structure. The data structure may comprise a table, linked list, tree, or some other data structure. Replica 405 further includes new rule 410, consensus process 412, start trigger operation 414, and notifications 416.

In operational scenario 400, new rule 410 is generated that is used to schedule actions performed against the data structure maintained by each replica of replicas 405-406. New rule 410 may be used to provide pruning operation, a test operation, a transaction operation to add a transaction to the data structure, or some other action. New rule 410 may be used to schedule a single instance of the action or may be used to perform the action at one or more intervals. New rules 410 may be generated by a user or may be generated from an application associated with the data structure. Once new rule is generated at replica 405, the rule, a consensus process 412 is initiated to verify and initiate a trigger operation to support the rule. In some implementations, consensus process 412 may exchange information about the rule with one or more other replicas 406, wherein the exchange of information may determine a consensus for when to start trigger operation 414. The consensus information may also be used to determine that the rule is valid by using signatures associated with the rule, wherein replica 405 may sign or provide a mathematical computation that indicates that new rule 410 is valid from replica 405. Once a consensus time is established for the rule and the rule is determined to be valid, trigger operation 414 is started on replica 405 and replicas 406 to trigger action notifications 416 associated with new rule 410.

As an example, a user may generate new rule 410 to perform a pruning operation on a database at periodic hourly intervals. In response to generating the rule, the rule may be exchanged with other replicas in the cluster, such that the various replicas may verify the rule and initiate a local trigger operation associated with the rules. Specifically, each of the replicas 405-406 may initiate the trigger operation once consensus is determined for the rule and generate triggers at the hourly intervals specified in association with the rule. Once an action notification is generated by trigger operation 414, a consensus operation occurs that is used to develop consensus for the action notification by the various replicas. In at least one implementation, consensus may occur when a threshold number of replicas also generate the same notification at the same time. When the threshold number of replicas do not generate the same notification or no consensus is reached in association with an action notification, replicas may not perform an action. In contrast, when the threshold number of replicas do generate the same notification and consensus is reached, each of the replicas may identify one or more rules associated with the notification and perform any actions associated with the one or more rules.

In some implementations, an action notification may include at least a time stamp and an identifier associated with the notification, wherein the identifier may be used to identify a set of one or more rules to which the notification applies. When consensus is identified for an action notification, one or more rules associated with the identifier can be identified and corresponding actions can be implemented on the replicated data structure. Returning to the example of the pruning operation, once an action notification has consensus, each of the replicas may initiate the required pruning operation by identifying the rule based on the identifier in the action notification and applying the action for the rule.

In some examples, each of the replicas in a computing environment may maintain one or more tables that each include one or more rules. These tables, which may comprise Cron tables in some implementations, can correspond to different identifiers in the action notifications generated at the various replicas. For example, a first Cron table may correspond to a first identifier, while a second Cron table may correspond to a second identifier. When an action notification is generated by trigger operation 414, the action notification may include an identifier for the table associated with generating the action.

Figure 5:
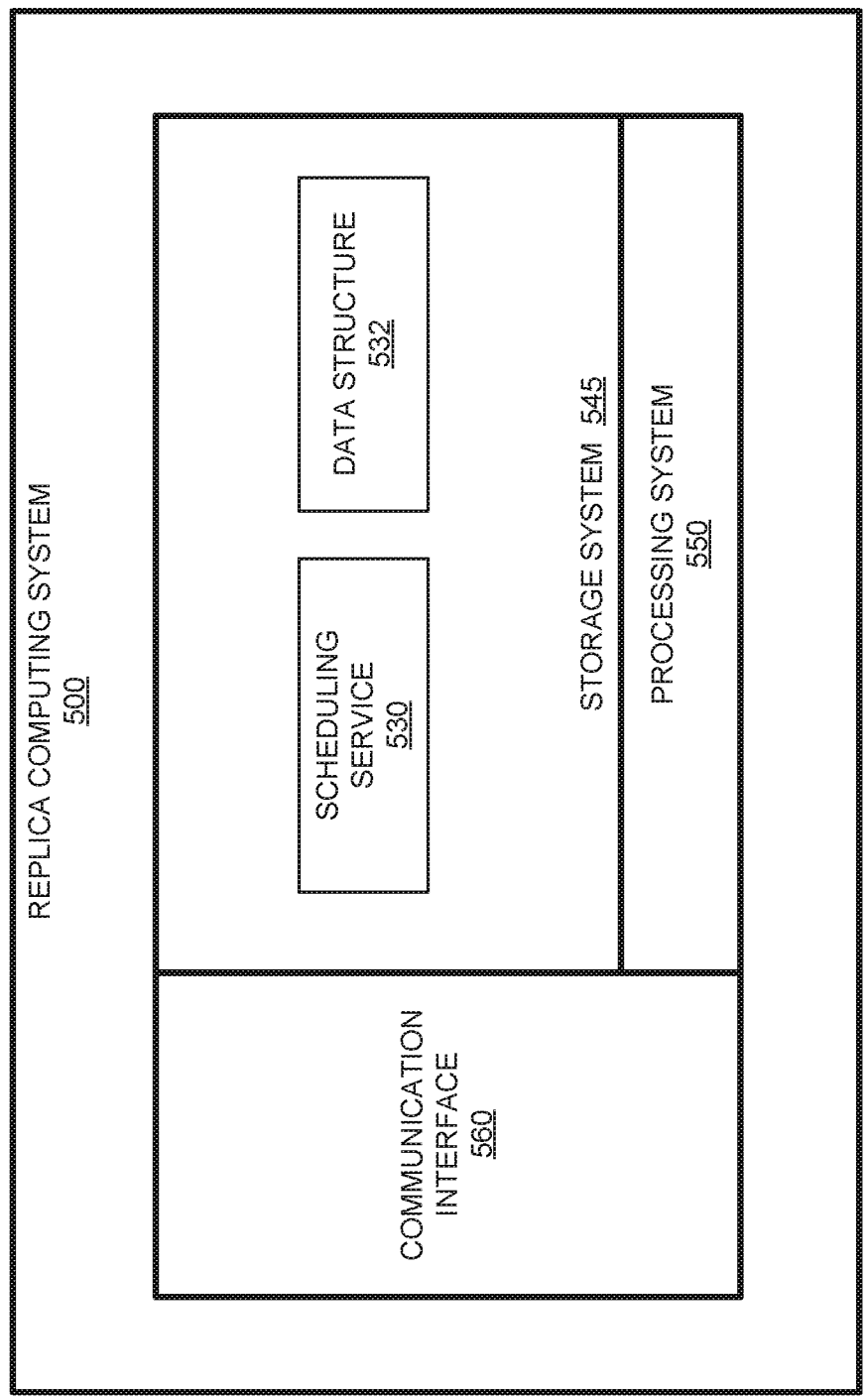
FIG. 5 illustrates a replica computing system to manage actions according to an implementation.

FIG. 5 illustrates a replica computing system to manage actions according to an implementation. Computing system 500 is representative of any computing system or systems with which the various operational architectures, processes, scenarios, and sequences disclosed herein for a user computing system can be implemented. Computing system 500 is an example of replicas 110-113, although other examples may exist. Computing system 500 includes storage system 545, processing system 550, and communication interface 560. Processing system 550 is operatively linked to communication interface 560 and storage system 545. Communication interface 560 may be communicatively linked to storage system 545 in some implementations. Computing system 500 may further include other components such as a battery and enclosure that are not shown for clarity.

Communication interface 560 comprises components that communicate over communication links, such as network cards, ports, radio frequency (RF), processing circuitry and software, or some other communication devices. Communication interface 560 may be configured to communicate over metallic, wireless, or optical links. Communication interface 560 may be configured to use Time Division Multiplex (TDM), Internet Protocol (IP), Ethernet, optical networking, wireless protocols, communication signaling, or some other communication format-including combinations thereof. Communication interface 560 may be configured to communicate with one or more other replicas in a computing environment, wherein each of the replicas may separately maintain a version of a data structure. In some implementations, communication interface 560 may further communicate with one or more control computing systems, client computing systems, or some other computing systems.

Processing system 550 comprises microprocessor and other circuitry that retrieves and executes operating software from storage system 545. Storage system 545 may include volatile and nonvolatile, removable, and non-removable media implemented in any method or technology for storage of information, such as computer readable instructions, data structures, program modules, or other data. Storage system 545 may be implemented as a single storage device but may also be implemented across multiple storage devices or sub-systems. Storage system 545 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 550 is typically mounted on a circuit board that may also hold the storage system. The operating software of storage system 545 comprises computer programs, firmware, or some other form of machine-readable program instructions. The operating software of storage system 545 comprises data structure 532 and scheduling service 530 that can provide at least operation 200 of FIG. 2. The operating software on storage system 545 may further include an operating system, utilities, drivers, network interfaces, applications, or some other type of software. When read and executed by processing system 550 the operating software on storage system 545 directs computing system 500 to operate as described herein.

In at least one implementation, scheduling service 530 directs processing system 550 to provide at least one trigger operation or generator that generates action notifications in accordance with rules for data structure 532. Each of the rules may be used to implement actions at one or more scheduled times. For example, a rule that is distributed to replicas in a computing environment including replica computing system 500 may be used to implement a transaction in data structure 532 at periodic intervals. When a rule is generated and identified by scheduling service 530, scheduling service 530 may direct processing system 550 to initiate a consensus determination for the rule. The consensus determination may be used to determine whether the rule is valid and may further be used to determine a consensus for initiating a trigger operation that generates action notifications in accordance with the rule. For example, a rule may indicate a request to initiate a prune operation on a data structure at hourly periodic intervals. Once the rule is identified by a replica, the replicas may exchange information for the rule to determine a time for starting a trigger operation for the rule. Once a time is established (e.g., a timestamp for starting the rule), each of the replicas in the computing environment may initiate a trigger operation that generates action notifications in accordance with the rule.

After rules are distributed to the replicas in a computing environment, scheduling service 530 directs processing system 550 to generate a first action notification and receive one or more additional action notifications from one or more other replicas in the cluster of replicas. In some implementations, the replicas in the computing environment may each provide action trigger operations that generate action notifications in accordance with the various rules. Referring to the example of a prune operation that initiates a prune operation at hourly periodic intervals, each of the replicas within the computing environment may generate an action notification at the hourly intervals and exchange a notification with at least one other replica in the computing environment to determine whether consensus exists to execute an action associated with the notification. In some implementations, the action notifications may be received directly from each of the replicas. In other implementations, the action notifications may be received from a single master replica or distributed in some other manner.

After the one or more additional action notifications are received from the one or more other replicas, scheduling service 530 directs processing system 550 to determine whether consensus exists for the first action notification based on the one or more additional action notifications. The consensus may be determined when a threshold number of replicas generate the same action notification. When consensus is not reached or when a threshold number of replicas did not generate the same action notification, scheduling service 530 may direct processing system 550 to not implement any actions for the action notification. In contrast, if consensus is reached for the first action notification, scheduling service 530 may direct processing system 550 to identify one or more rules associated with the first action notification and initiate one or more actions associated with the one or more rules on data structure 432.

In some implementations, an action notification may include a timestamp and an identifier associated with one or more rules. When an action notification receives consensus, scheduling service 530 may direct processing system 550 to identify one or more rules associated with the identifier and the timestamp and execute one or more actions associated with the identified rules. In some examples, the rules may be organized into different tables, such as Cron tables. When a new action notification receives consensus, a table can be identified from the identifier in the action notification, and any rules within the table can be selected based on the timestamp information in the table. For example, while a first rule in the Cron table may implement an action every hour, another rule in the Cron table may implement an action every two hours. Thus, different rules can be selected from a table based on the timing requirements of the rule and the timestamp included with the rule.

In some examples, each of the rules that are distributed to the replicas in the computing environment may indicate at least one action to be implemented and timing requirements associated with the rule. The actions associated with a rule may include pruning actions, transaction operations (e.g., adding a transaction to a transactional database), or some other action. The timing information may indicate a start time for implementing the rule, intervals associated with the rule, or some other scheduling or timing information associated with the rule. As an example, a rule may define that a pruning operation should start at a first time and repeat at periodic intervals for a defined length. Once the rule is created, distributed, and consensus is reached for the start time between the various replicas, the replicas may generate action notifications using a trigger operation.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating replica in a cluster of replicas, the method comprising:

generating a first action notification at the replica by a processor;

receiving one or more additional action notifications, via a communication interface, from one or more other replicas in the cluster of replicas;

determining, by the processor, that consensus exists for the first action notification based on the one or more additional action notifications, the consensus being determined when a threshold number of replicas generate a same action notification;

in response to determining that consensus exists for the first action notification:

identifying one or more rules associated with the first action notification; and performing one or more actions associated with the one or more rules on a data structure supported by the replica by a processing system causing a change to a storage system, the data structure being stored in the storage system.

2. The method of claim 1, wherein the cluster of replicas comprises a cluster of virtual machines.

3. The method of claim 1, wherein the one or more actions comprise a prune action, a transaction action, or a test action.

4. The method of claim 1 further comprising:

communicating the first action notification to at least one other replica in the cluster of replicas.

5. The method of claim 1, wherein the first action notification comprises a timestamp and an identifier associated with at least the one or more rules.

6. The method of claim 1 further comprising:

receiving a new rule from a second replica;

determining that the new rule is valid based on a consensus determination from the cluster of replicas; and initiating a trigger operation, wherein the trigger operation generates one or more action notifications in accordance with timing information associated with the new rule.

7. The method of claim 6, wherein the timing information comprises periodic intervals for generating the one or more action notifications for the new rule.

8. The method of claim 1, wherein generating the first action notification at the replica comprises generating the first action notification at an interval defined by the one or more rules.

9. A method of operating replica in a cluster of replicas, the method comprising:

generating a first action notification at the replica by a processor;

receiving one or more additional action notifications, via a communication interface, from one or more other replicas in the cluster of replicas;

determining, by the processor, that consensus exists for the first action notification based on the one or more additional action notifications, wherein the received action notifications include signatures, hashed values, timestamps, identifiers, or other information that can be used in determining consensus for locally generated action notifications;

in response to determining that consensus exists for the first action notification:

identifying one or more rules associated with the first action notification; and performing one or more actions associated with the one or more rules on a data structure supported by the replica by a processing system causing a change to a storage system, the data structure being stored in the storage system.

10. The method of claim 9, wherein the cluster of replicas comprises a cluster of virtual machines.

11. The method of claim 9, wherein the one or more actions comprise at least one of a prune action, a transaction action, or a test action.

12. The method of claim 9, further comprising communicating the first action notification to at least one other replica in the cluster of replicas.

13. The method of claim 9, wherein the first action notification comprises a timestamp and an identifier associated with at least the one or more rules.

14. The method of claim 9, wherein determining that consensus exists comprises applying a Byzantine Fault Tolerant (BFT) consensus protocol.

15. The method of claim 9, wherein identifying the one or more rules comprises accessing at least one Cron table that schedules commands for the replica.

16. The method of claim 9, further comprising scheduling implementation of at least one of the one or more actions at a defined period following a timestamp associated with the first action notification.

17. The method of claim 9, wherein performing the one or more actions comprises implementing the one or more actions as State Machine Replication (SMR) operations.

18. The method of claim 9, further comprising triggering the one or more actions in a sequence associated with a priority for each of the one or more actions, wherein the sequence is common amongst all replicas in the cluster of replicas.

19. The method of claim 9, wherein generating the first action notification comprises generating the first action notification at an interval defined by at least one of the one or more rules.

* * * * *